Feb. 14, 1967 R. H. GANZ 3,303,631
MACHINE FOR AND METHOD OF APPLYING CARRIERS TO CONTAINERS
Filed Oct. 8, 1962 9 Sheets-Sheet 1

Fig. 1.

INVENTOR.
ROBERT H. GANZ
BY
Mason, Porter, Diller Stewart
ATTORNEYS

Feb. 14, 1967 R. H. GANZ 3,303,631
MACHINE FOR AND METHOD OF APPLYING CARRIERS TO CONTAINERS
Filed Oct. 8, 1962 9 Sheets-Sheet 4

INVENTOR.
ROBERT H. GANZ
BY
Mason, Porter, Diller & Stewart
ATTORNEYS

Feb. 14, 1967   R. H. GANZ   3,303,631
MACHINE FOR AND METHOD OF APPLYING CARRIERS TO CONTAINERS
Filed Oct. 8, 1962   9 Sheets-Sheet 8

INVENTOR.
ROBERT H. GANZ
BY
Mason, Porter, Diller & Stewart
ATTORNEYS

3,303,631
MACHINE FOR AND METHOD OF APPLYING CARRIERS TO CONTAINERS
Robert H. Ganz, Bergenfield, N.J., assignor to Continental Can Company, Inc., New York, N.Y., a corporation of New York
Filed Oct. 8, 1962, Ser. No. 228,800
20 Claims. (Cl. 53—48)

This invention relates in general to new and useful improvements in the packaging art, and more particularly relates to the application of carriers to containers to form a package of the type wherein the carrier is wrapped around the containers and together with the containers form a rigid unit.

It is desirable to form containers into packages at at least the same rate as the containers are closed by an associated closing machine. In order to meet with this requirement, the wrap-around carriers must be rapidly applied to the containers. The removal of carrier blanks from a hopper and the positioning of the carrier blanks into overlying centered relation with respect to the containers is time consuming and requires a slowing down of the carrier applying machine.

Accordingly, it is a primary object of this invention to provide a novel mechanism for transferring carrier blanks from a hopper to positions overlying said set of containers wherein the transfer of the carrier blanks requires a minimum of time.

Another object of this invention is to provide a novel mechanism for transferring carrier blanks from a hopper to sets of carriers, the mechanism including a first blank carrier for removing blanks from the hopper and moving the same to an intermediate position, a second blank carrier for receiving the blank from the first blank carrier in positioning the blank into overlying relation to a set of containers, the second blank carrier positioning the blank while the first blank carrier is returning to the hopper to obtain another blank.

Another object of this invention is to provide a novel mechanism for rapidly moving carrier blanks from a hopper to positions overlying sets of containers, the mechanism including a first swinging mechanism having blank gripping means thereon for moving blanks from the hopper to a position intermediate the hopper and a pair of continuously moving containers, a second member having blank gripping means thereon, movable into the plane of the first member for receiving blanks therefrom, and being further movable toward the line of containers and then downwardly directly overlying the containers and moving with the containers for the proper alignment of carrier blanks carried thereby with sets of underlying containers.

Another object of this invention is to provide a novel mechanism for simultaneously positioning carrier blanks into overlying relation to sets of containers, and then folding the carrier blanks around the sets of containers while simultaneously stripping the carrier blanks from the means previously supporting the carrier blanks.

A further object of this invention is to provide a novel mechanism for moving carrier blanks into overlying relation to sets of bottles and applying said carrier blanks to the bottles, the mechanism including carrier blank grip means engageable with outer portions of carrier blanks and carrier blank folding blades disposed intermediate the carrier blank grip means, the mechanism further including means for simultaneously moving the carrier blank grip means and the folding blades into alignment with a set of bottles, aligning a carrier blank with the bottles, and then moving the carrier blank downwardly while moving with the bottles to force the bottles through openings in the top wall panel of the carrier blank, after which further movement of the mechanism results in the folding blades folding the carrier blank around the sides of the bottles and automatically stripping the same from the carrier blank grippers.

Still another object of this invention is to provide in a machine for applying carrier blanks to containers means for tightly compacting the containers and bringing the lower side wall panel portions of the carrier blank into tight interlocking relation with the containers, the mechanism including rotating wheels or disks which move directly beneath the containers and simultaneously fold bottom panel portions of the carrier beneath the containers and urge the same towards one another to tightly pull the lower portion of the carrier into interlocking relation with the containers.

Yet another object of this invention is to provide a novel carrier blank folding mechanism which includes opposed rotating wheels or disks and cooperating carrier blank guides which retain portions of the carrier blanks in engagement with the wheels whereby as containers in a carrier blank partially wrapped therearound pass between the rotating wheels, the carrier blank bottom panel portions are first partially folded beneath the containers, and then progressively forced together to form interlocks between the containers and lower side wall portions of the carrier whereby the carrier may be later snugly locked around the bottom of the containers to form the desired tight package.

A still further object of this invention is to provide in a machine for wrapping carrier blanks around sets of containers to form compact packages, a carrier blank folding mechanism which includes a pair of opposed wheels and cooperating guides which are cooperable to tightly fold bottom panels of a carrier blank beneath the associated containers and with the carrier interlocking with the containers, after which the side wall panels of the carrier are readily engageable by suitable grippers to hold the same in a compact position while the bottom forming panels of the carrier are interlocked to complete the carrier.

Another object of this invention is to provide a novel mechanism in a machine for applying carrier blanks to containers, which mechanism includes means for holding carrier blanks and being adapted to position the carrier blanks into overlying aligned relation to containers, and folding means for automatically folding the carrier blank down around the containers and releasing the carrier blank from the carrier blank holding means, the mechanism being mounted on a shaft for rotary movement so as to be extremely simple.

Yet another object of this invention is to provide in a carrier blank applying machine for forming packages of the type including a plurality of containers, a wrap-around carrier, the mechanism including a rotating shaft driven in timed relation to the movement of containers therebeneath, and the rotating shaft having mounted thereon for rotation therewith means for temporarily holding carrier blanks to apply the carrier blanks to the containers passing beneath the mechanism, and folding blades for folding the carrier blanks around containers in the formation of the package with the folding blades serving to release the carrier blanks from the holding means.

With the above, and other objects in view that will hereinafter appear, the nature of the invention will be more clearly understood by reference to the following detailed description, the appended claims and the several views illustrated in the accompanying drawings:

Figure 13:
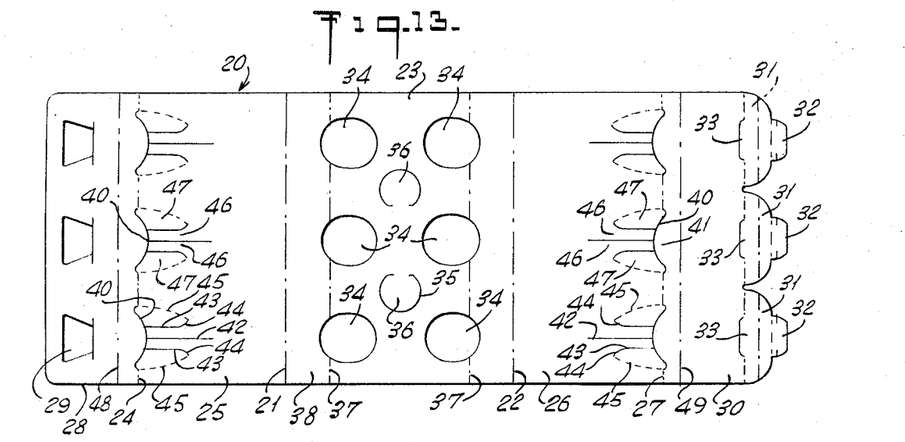
FIGURE 13 is a plan view of the carrier blank, on a large scale, which is to be applied utilizing the machine.

Referring now to the drawings in detail, reference is first made to FIGURE 13 wherein there is illustrated a carrier blank which is to be applied in accordance with this invention. The carrier blank is generally referred to by the numeral 20 and is of an elongated rectangular outline. In view of the fact that the carrier blank 20 in itself does not form part of this invention, the details thereof will only be briefly described so that the manner in which it is applied to bottles and similar containers may be readily understood. Carrier blank 20 is provided with two transverse fold lines 21 and 22 which are generally centrally located and which set off a top wall panel 23. A fold line 24 cooperates with the fold line 21 to set off a side wall panel 25. A similar side wall panel 26 is set off by the fold line 22 in cooperation with another transverse fold line 27. The fold line 24 sets off at one end of the blank 20 a bottom forming panel 28 having suitable locking tab receiving openings 29 formed therein. Fold line 27 sets off at the other end of the carrier blank 20 a bottom forming panel 30 which is provided with suitable flaps 31 having oppositely facing locking tabs 32 and 33 connected thereto.

The top wall panel 23 is provided with a plurality of openings 34 for the reception of necks of bottles. The top wall panel 23 is also provided with generally C-shaped cuts 35 outlining inwardly foldable tabs 36 which, when inwardly folded, leave in the top wall panel 23 suitable finger-receiving openings to facilitate the carrying of the package formed by the carrier blank 20 in combination with a plurality of containers.

The top wall panel 23 is provided with transverse fold lines 37 which are disposed adjacent the fold lines 21 and 22 and together therewith set off outer portions 38 of the top wall panel 23.

It is to be noted that each of the fold lines 24 and 27 is interrupted by a plurality of C-shaped cuts 40. The C-shaped cuts 40 define projections 41 which remain part of the associated bottom forming panels 28 and 30. The C-shaped cuts 40 are spaced apart in accordance with the spacing of the containers about which the carrier blank 20 is to be wrapped and are aligned therewith. Each of the side wall panels 25 and 26 is provided with a straight line cut 42 extending from the associated C-shaped cut 40 normal to the fold line 24. Two other cuts 43 are formed in each of the side wall panels in parallel relation to each cut 42 and on opposite sides thereof. The cuts 43 have arcuate portions 44 remote from the C-shaped cut 40 and weakening fold lines 45 extend from the ends of the arcuate portions 44 to the ends of the C-shaped cut 40 associated therewith. The cuts 42 and 43, in conjunction with the fold line 45, define two centrally located flaps 46 and two outer flaps 47 adjacent each of the C-shaped cuts 40.

At this time, it is also pointed out that the bottom forming panel 28 is provided with a transverse fold line 48 adjacent the fold line 24. A similar fold line 49 extends transversely across the bottom forming panel 30 adjacent the fold line 27.

In accordance with this invention, it is proposed to move containers continuously in two adjacent rows with the containers in the two rows being transversely aligned. It is also proposed to apply the carrier blank 20 shown in FIGURE 13 to a set of six of such containers. In accordance with this invention, the carrier blank 20 is first positioned on the set of six containers by aligning the openings 34 in the top wall panel 23 with the necks of the containers and moving the top wall panel 23 down thereover. The side wall panels 25 and 26 are then folded alongside the containers, after which the carrier blank 20 is folded along the fold lines 24 and 48 on one end and the fold lines 27 and 49 on the other end partially beneath the containers and into interlocking engagement with the lower portions of the containers with the flaps 46 and 47 outwardly deflecting in the manner shown in FIGURE 15. The bottom forming panels 28 and 30 are then folded beneath the containers in overlapping relation and are locked together to complete the package.

Figure 1:
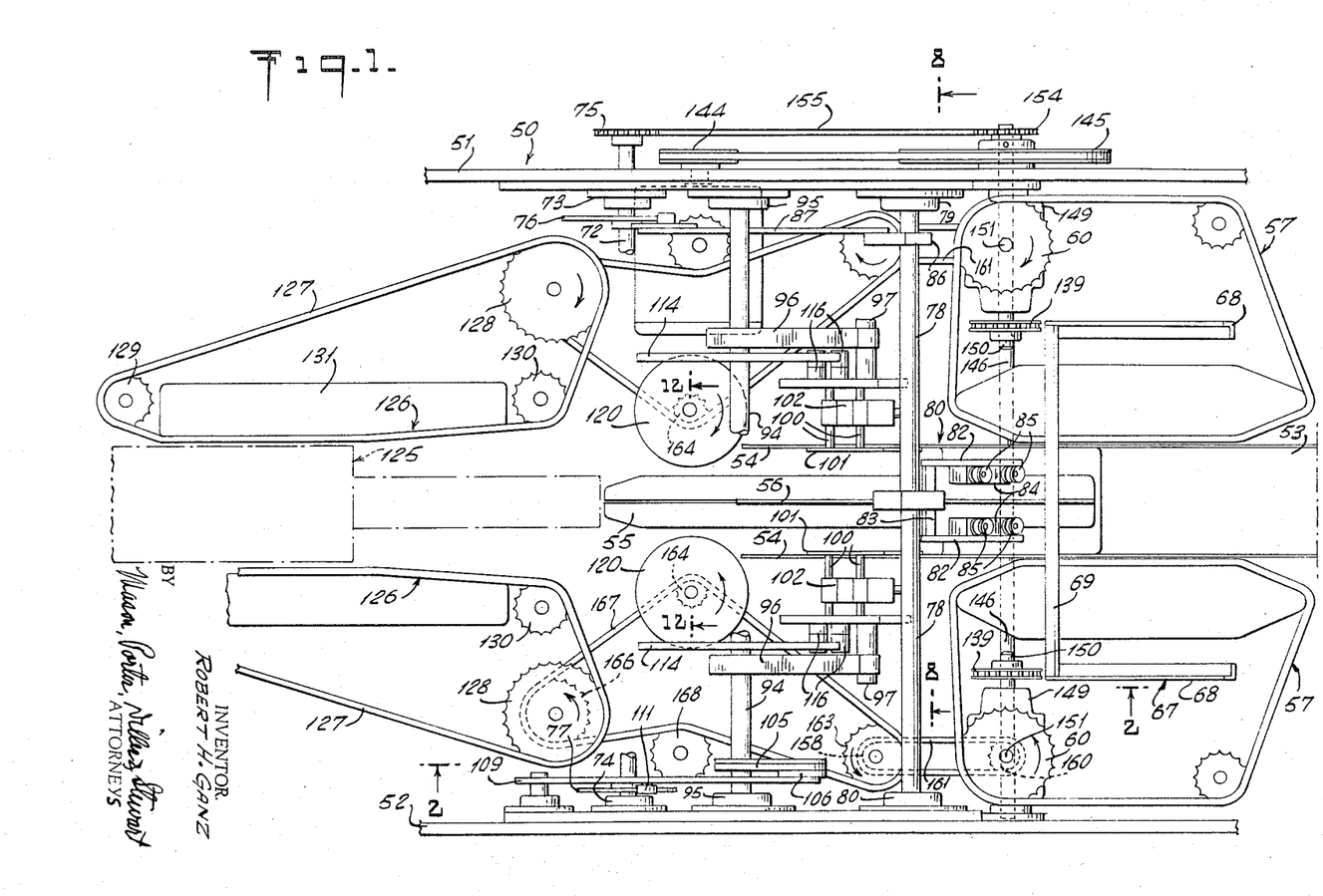
FIGURE 1 is a fragmentary plan view of the machine which is the subject of this invention and shows generally the specific details thereof, specific details of a carrier blank hopper being omitted for purposes of clarity.
Figures 14, 15:
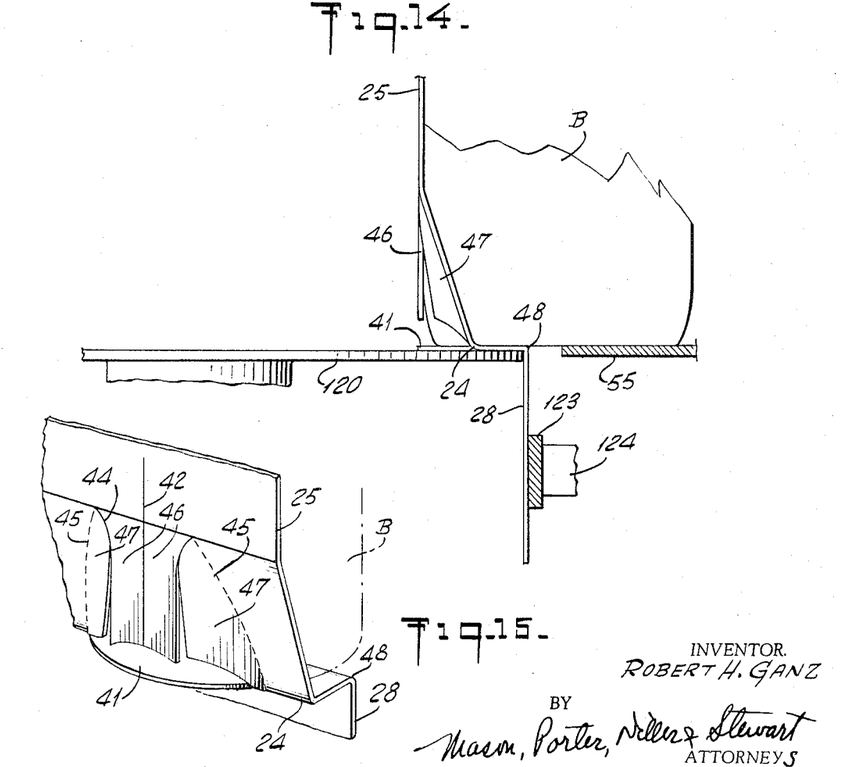
FIGURE 14 is an enlarged fragmentary vertical sectional view showing the specific manner in which the carrier is folded beneath a container and interlocked therewith.
FIGURE 15 is a perspective view showing a portion of the carrier after it has been wrapped around a lower portion of a container, the container being shown in phantom lines.
Figure 16:
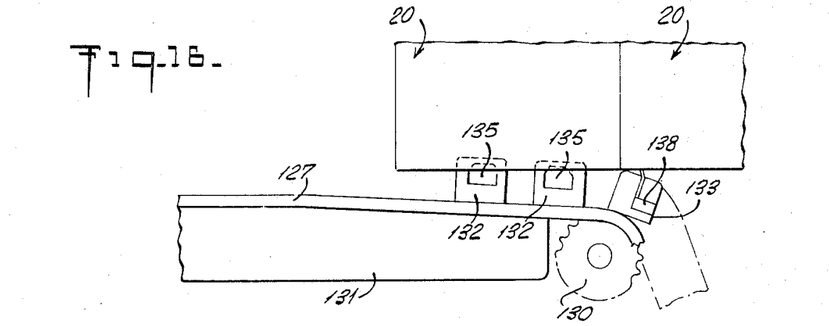
FIGURES 16, 17 and 18 show in progression the engagement of means for forcing interconnected containers and carriers through the machine and holding together side wall panels of the carriers as the bottom forming panels thereof are being interlocked.
Figure 17:
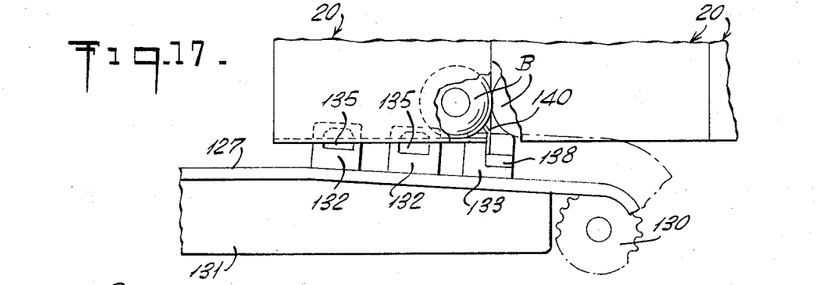

In accordance with this invention, there has been provided a machine for automatically applying the carrier blanks 20 to a group of six bottles, such as the bottle B shown in FIGURES 14 and 15. The machine is generally referred to by the numeral 50 and is formed of a frame including a pair of side plates 51 and 52. The right end of the machine 50, as viewed in FIGURE 1, is the entrance end and is provided with a plate 53 along which the bottles B are delivered in two rows. The bottles B are retained on the plate 53 by means of elongated guide bars 54 which, together with the plate 53, are suitably supported by the frame of the machine 50. The guide bars 54 extend to the left beyond the plate 53 and a narrow support plate 55 is disposed in alignment with the plate 53 and between the guide bars 54 as a general extension of the plate 53. The support plate 55 is provided with an upstanding divider 56.

The bottles B are delivered to the plate 53 in two rows, but not necessarily with the bottles in transverse alignment. In order to assure that the bottles in the two rows are in transverse alignment and to feed the bottles from the plate 53 to and along the plate 55, identical cooperating conveyors, generally referred to by the numeral 57, are disposed on opposite sides of the plate 53 and the support plate 55. Each of the conveyors 57 includes an endless chain 58 which is entrained over a drive sprocket 60, an idler sprocket 61 and a guide 62, the guide 62 having a side portion 63 disposed parallel to the longitudinal axis of the machine 50 and corner portions 64 and 65 generally aligned with the sprockets 60 and 61. Each of the chains 58 is provided with a plurality of generally triangle pusher elements 66 which are adapted to be fed between adjacent bottles B for the purpose of moving the bottles along the plates 53 and 55. The pusher elements 66 are in transverse alignment on the two conveyor belts 58 and are spaced apart in unit multiples of the diameters of the bottles B. In this manner the conveyors 57 feed the two rows of bottles B with adjacent bottles in transverse alignment.

The machine 50 also includes a hopper, generally referred to by the numeral 67, which generally overlies the support plate 55 and which is suitably supported by the frame of the machine 50. The hopper 67 includes a lower guide structure 68 for supporting a stack S of carrier blanks 20 with the stack being in a downwardly sloping relation so that the carrier blanks are constantly fed toward the bottom of the hopper 67. A lower stop 69 extends transversely at the bottom of the hopper 67 to prevent the downward movement of the lower edges of the carrier blanks. A suitable finger 70 is opposed with respect to the stop 69 and cooperates therewith to normally retain the carrier blanks within the hopper 67.

The machine 50 includes a mechanism, generally referred to by the numeral 71, for removing individual carrier blanks 20 from the hopper 67 and applying the same to the upper ends of the bottles B. The mechanism 71 includes a rotating shaft 72 which extends transversely of the machine 50 and is rotatably journalled in bearings 73 and 74 carried by the side plates 51 and 52, respectively. It is to be noted that the shaft 72 extends through the side plate 51 and is provided with a sprocket 75 on the outer end thereof. The sprocket 75 is driven in a manner which will be described in detail hereinafter. The shaft 72 is provided with a cam 76 adjacent the side plate 51 and a cam 77 adjacent the side plate 52 for purposes to be described hereinafter.

Figure 4:
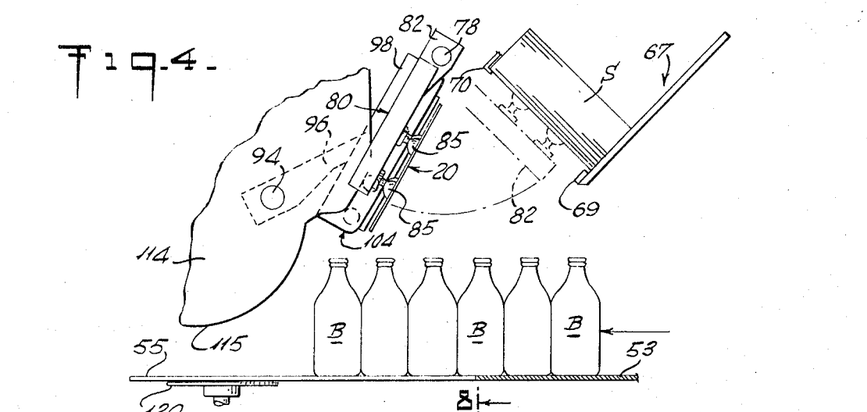
FIGURE 4 is a schematic vertical sectional view taken longitudinally through the machine and shows a carrier blank in an intermediate position being transferred from one blank carrier to the other blank carrier.

The mechanism 71 also includes a transverse shaft 78 which extends between the side plates 51 and 52 and which is suitably journalled in bearings 79 carried by the side plates. The shaft 78 carries a centrally located first blank carrier 80 for swinging movement therewith. The blank carrier 80 includes an arm 81 which is fixedly secured to the shaft 78. The arm 81, in turn, carries a pair of arms 82 which are connected to the arm 81 by means of a transverse connector 83. Each of the arms 82 supports a block 84 on which there are mounted suction cups 85. The first blank carrier 80 is mounted for swinging movement between a position shown in FIGURE 2 wherein the suction cups 85 will engage a lowermost carrier blank 20 in a downwardly and forwardly disposed position, as shown in FIGURE 4, wherein a carrier blank 20 is removed from the suction cups 85.

Figure 2:
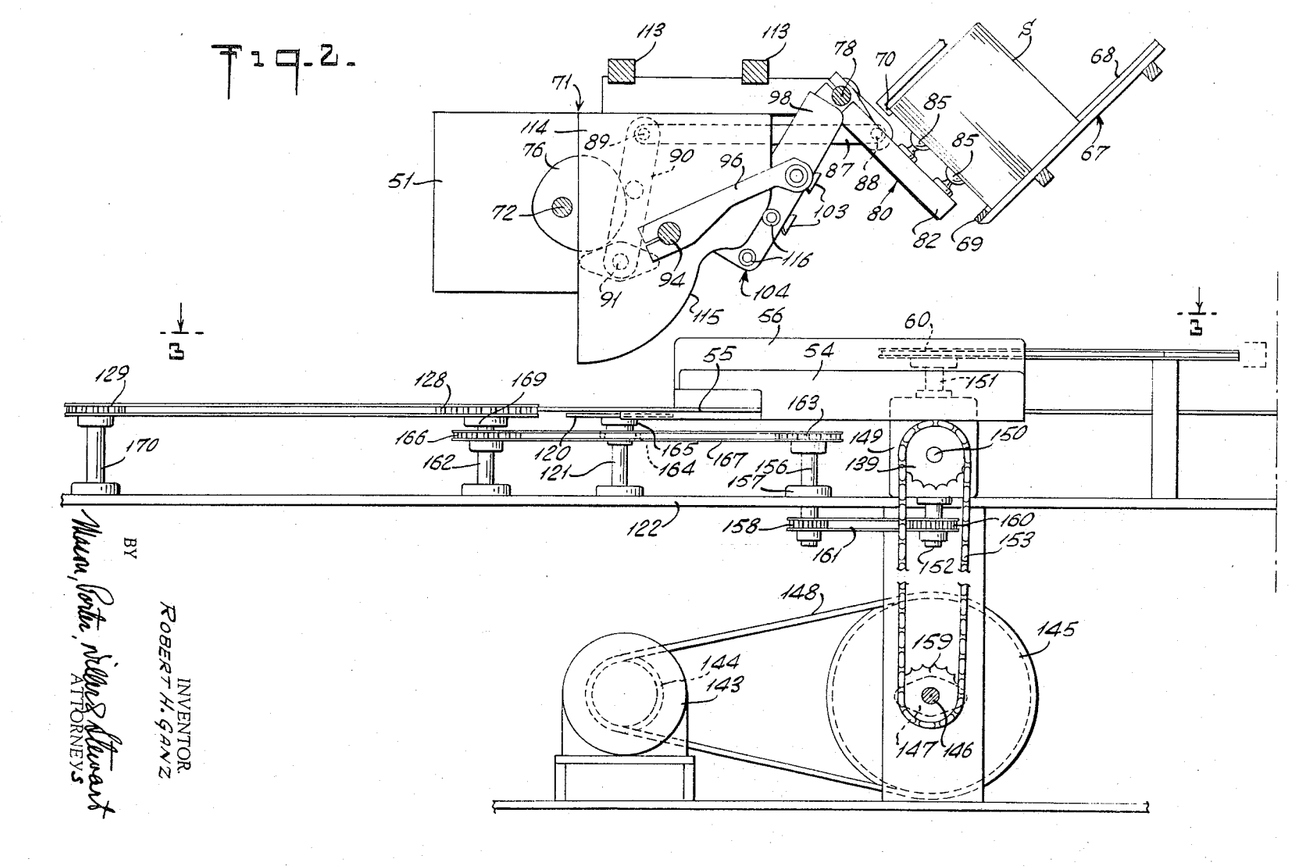
FIGURE 2 is a longitudinal vertical sectional view taken along the line 2—2 of FIGURE 1 and shows more specifically the details of the machine, the machine being in a position wherein a carrier blank is engaged for removal from the hopper.
Figures 5, 6, 7:
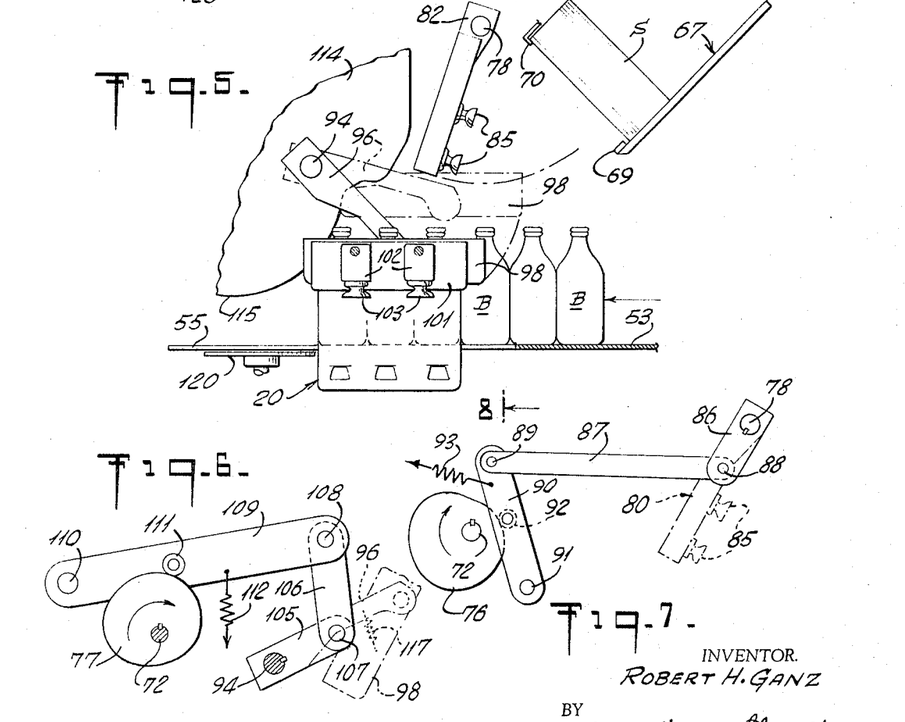
FIGURE 5 is a fragmentary longitudinal vertical sectional view similar to FIGURE 4 and shows a blank being applied to a plurality of containers while the first blank carrier is returning to the hopper to remove another carrier blank therefrom.
FIGURE 6 is a schematic elevational view showing the specific mechanism for controlling the movement of the second blank carrier.
FIGURE 7 is a schematic elevational view showing the mechanism for actuating the first blank carrier.
Figure 8:
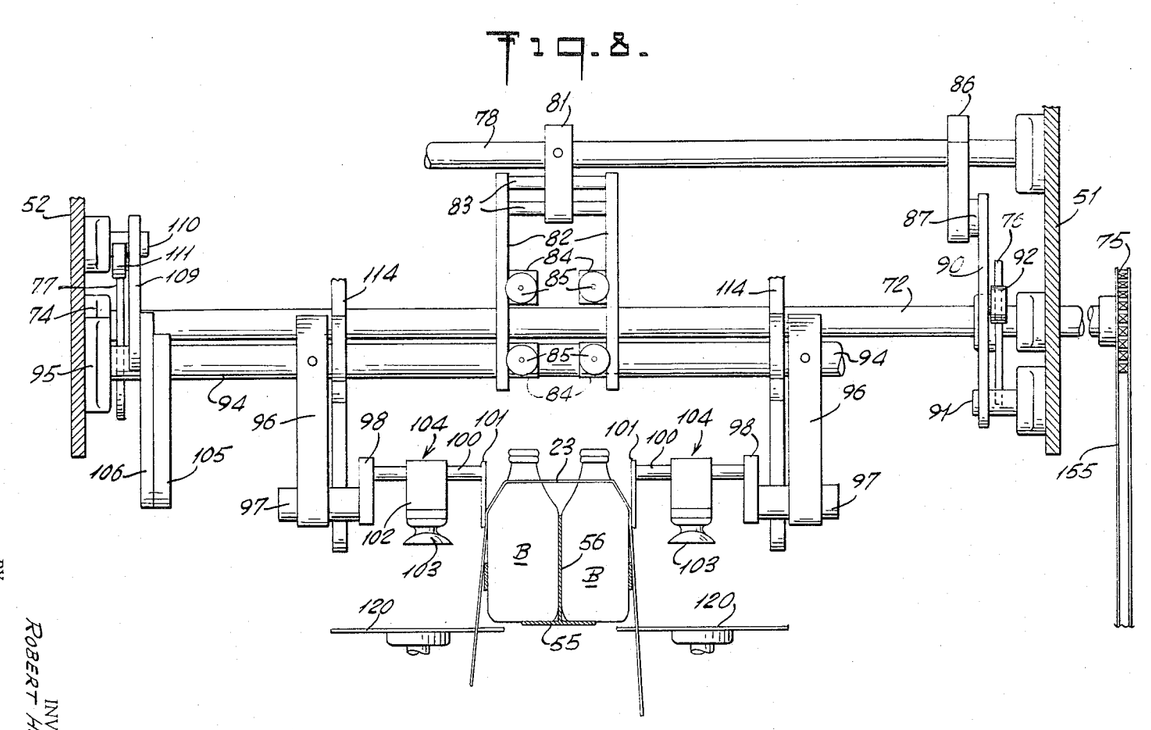
FIGURE 8 is an enlarged transverse vertical sectional view taken through the machine along the section line 8—8 appearing in FIGURES 1 and 5, and shows more specifically the details of the machine.
Figure 9:
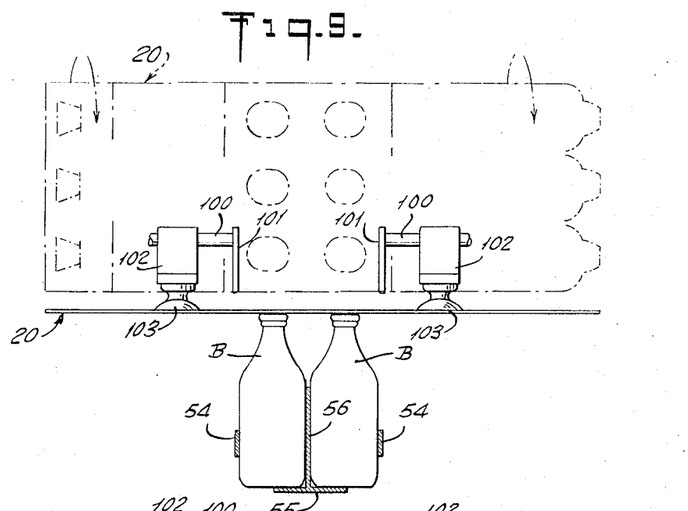
FIGURE 9 is an enlarged transverse vertical schematical sectional view similar to a central portion of FIGURE 8 and shows the position of the mechanism at the time a carrier blank is disposed in overlying position with respect to a set of containers.
Figure 10:
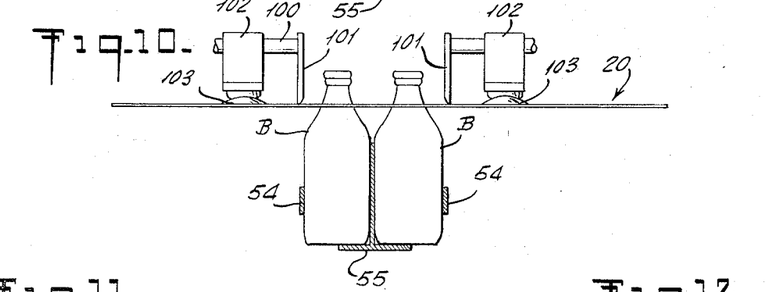
FIGURE 10 is a view similar to FIGURE 9 and shows a carrier blank as it is forced down over the necks of the containers.

In order to facilitate the swinging of the first blank carrier 80, a crank arm 86 is secured to the shaft 78 adjacent the side plate 51. The crank arm 86 has an elongated link 87 pivotally connected to one end thereof by means of a pin 88. The opposite end of the link 87 is connected by means of a pin 89 to a lever 90 which is mounted on a stub shaft 91, as is best shown in FIGURES 2 and 8. The lever 90 is provided intermediate its ends with a cam follower 92 which rides on the cam 76. As is best shown in FIGURE 7, the lever 90 is constantly urged toward the cam 76 by means of a spring 93 so that the cam 76 controls both the timing of the movement of the first blank carrier 80 and the amplitude of the movement.

A shaft 94 extends transversely between the side plates 51 and 52 and is suitably journalled in bearings 95 for limited pivotal movement. The shaft 94 has secured thereto for pivotal movement therewith generally rearwardly extending arms 96 which are equally spaced on opposite sides of the center line of the machine. Each of the arms 96 carries a stub shaft 97. The stub shafts 97 are in transverse alignment and extend inwardly from the arms 96. Each of the stub shafts 97 carries an elongated bar 98 which is rigidly secured thereto for pivotal movement therewith. A pair of rods 100 extends inwardly from each of the bars 98 and a folding blade 101 is rigidly supported at the inner ends of each of the pair of rods 100. Each rod 100 carries a block 102 on which there is mounted a suction cup 103. The bars 98, lines 100, blocks 102 and suction cups 103 may be considered to constitute a second blank carrier which is generally referred to by the numeral 104.

In order that the second blank carrier 104 may be actuated in timed relation to the first blank carrier 80, the blank carrier 104 is moved through suitable mechanism driven by the shaft 72 through the cam 77. This mechanism as is best shown in FIGURE 6, includes a crank arm 105 which is rigidly secured to the shaft 94 adjacent the side plate 52. The crank arm 105 is pivotally connected to a link 106 by means of a pivot pin 107 and the opposite end of the link 106 is pivotally connected by means of a pivot pin 108 to a lever 109. The lever 109 is pivotally mounted at its opposite end on a pivot shaft 110 which projects inwardly from the side plate 52. An intermediate portion of the lever 109 carries a cam follower 111 which rides on the cam 77. A spring 112 is connected to the lever 109 to hold the cam follower 111 in engagement with the cam 77 at all times.

The frame of the machine 50 includes suitable transverse frame members 113 which support a pair of cam plates 114. The cam plates 114 are vertically disposed and are positioned inwardly of and adjacent the arms 96 and the bars 98. The cam plates 114 have cam surfaces 115 and the bars 98 are each provided with a pair of cam followers 116 which engage the respective cam surface 115. The cam followers 116 are constantly urged towards the cam surfaces 115 by means of springs 117 acting on the bars 98, as is shown, for example, in FIGURE 6. The springs 117 may have their other ends connected to the arms 96.

The mechanism for operating the second blank carrier 104 is so dimensioned to provide for the movement of the second blank carrier 104 between the position shown in FIGURE 4 for receiving a carrier blank 20 from the first blank carrier 80 and then transferring the carrier blank 20 into interlocking engagement with the necks of the bottles B, as is shown in FIGURE 8.

*Operation of blank positioning mechanism*

In the application of carrier blanks 20 to a plurality of the bottles B, the first blank carrier 80 swings in a counterclockwise direction so that the suction cups 85 thereof engage a carrier blank 20 disposed lowermost in the stack S, as is shown in FIGURE 2. The suction cups 85 are then rapidly moved in a clockwise direction from the position shown in FIGURE 2 pulling the lowermost carrier blank 20 from the hopper 67. The carrier blank 20 is swung by the first blank carrier 80 to the position shown in FIGURE 4 at which time it is immediately engaged by the suction cups 103 of the second blank carrier 104 which begins its clockwise downward movement. The carrier blank 20 is moved downwardly in timed relation to the movement of six bottles B therebeneath and the carrier blank 20 is so aligned with the necks of the bottles B whereby the necks are received through the openings 34 in the top wall panel 23 thereof. The movement of the suction cups 103 is such that the carrier blank 20 is moved downwardly and longitudinally to firmly engage the carrier blank with the necks of the bottles. It is to be understood that the longitudinal movement of the blank after it is engaged with the bottles is at the same rate as the rate of movement of the bottles. As the second blank carrier 104 continues its downward movement, the top wall panel 23 of the carrier blank 20 is limited in its downward movement by the engagement thereof with the enlargements of the bottles B, as is clearly shown in FIGURE 8. Further downward movement of the second blank carrier 104 after this stoppage of the downward movement of the top wall panel 23 results in the folding blades 101 folding the carrier blank 20 along the fold lines 37 and 21 and 22, as is shown in FIGURE 8. This folding of the carrier blank 20 results in the movement of the carrier blank away from the suction cups 103 so as to release the carrier blank 20 from the suction cups 103.

It is to be understood that while the second blank carrier 104 is functioning to apply the carrier blank to a set of bottles, the first blank carrier 80 is moving upwardly towards the hopper 67 to receive the next lower carrier blank. Therefore, by utilizing two blank carriers and transferring a blank from one blank carrier to the other, a more rapid feeding of blanks to the containers or bottles B may be accomplished than was heretofore possible.

Referring now to FIGURE 15 in particular, it will be seen that after the carrier blank 20 has been initially applied to six bottles B, it is desirable to begin closing the bottom of the carrier to form a compact package with the bottles. To this end, it is desirable to fold the carrier blank 20 along the fold lines 24 and 27 and the fold lines 48 and 49 and to tightly pull the portions of the carrier blank 20 disposed between the fold lines 24 and 48 on one hand and the fold lines 27 and 49 on the other hand inwardly together and immediately beneath the bottoms of the bottles B so that an interlock may be obtained between the side wall panels 25 and 26 of the carrier and the bottles in the manner shown in FIGURE 15.

In order to obtain the desired folding of the carrier blank 20 beneath the bottles B and the tightening of the connections between the carrier blank and the bottles, the machine 50 also includes a pair of opposed folding wheels or disks 120 which are disposed on the opposite sides of the center line of the machine alongside the support plate 55 and lying generally in the same plane as the support plate 55. The folding wheels 120 are carried by upstanding shafts 121 which are mounted on a horizontal plate 122 which forms a part of the frame of the machine 50. A pair of combined carrier blank panel guides and stops 123 underlie the path of the bottles B in transverse alignment with the folding wheels 120. The guides 123 are carried by a suitable support 124 which is secured to the frame of the machine 50 in any desired manner.

Figure 3:
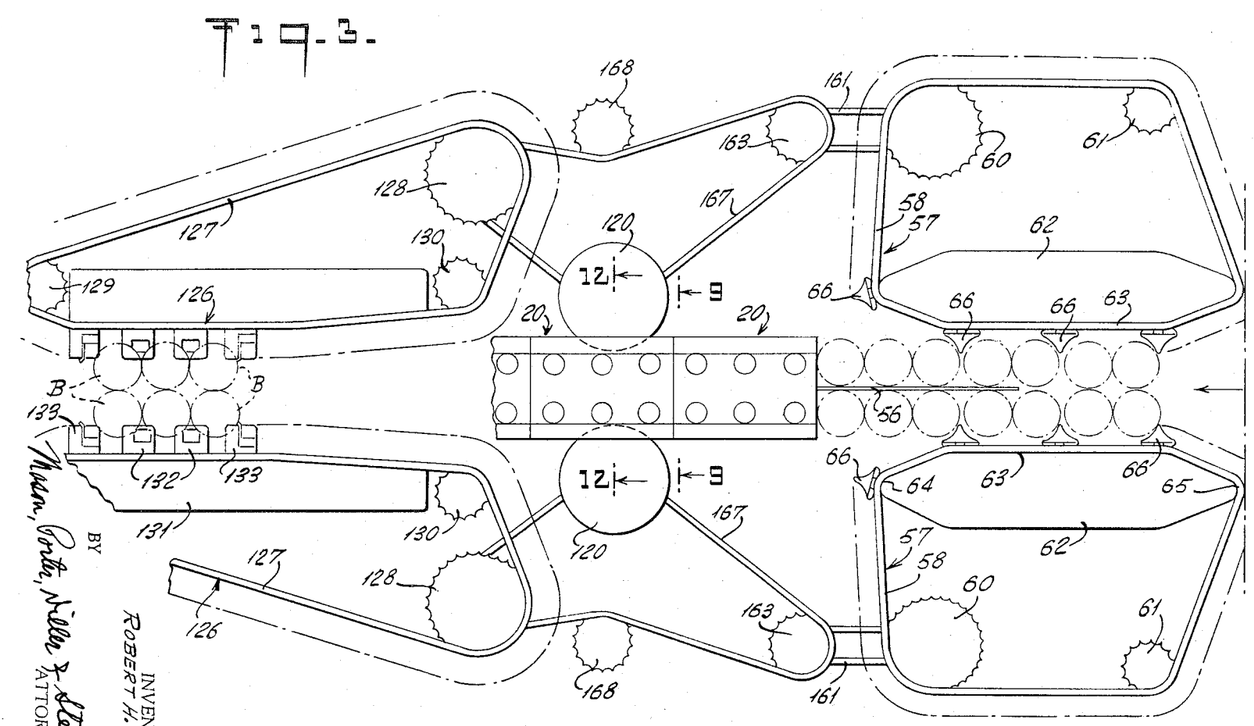
FIGURE 3 is a horizontal sectional view taken along the line 3—3 of FIGURE 2 and shows more specifically the means for feeding containers through the machine and finally wrapping bottom portions of carriers around the sets of containers.
Figure 11:
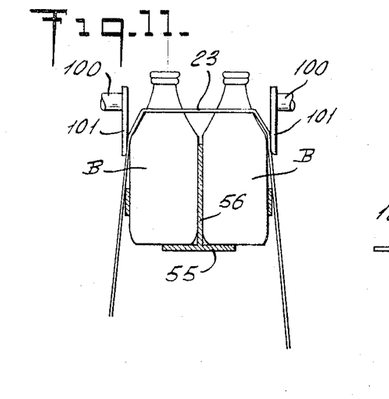
FIGURE 11 is a fragmentary transverse schematical sectional view showing the carrier blank as it is folded down alongside the containers.

Due to the fact that the folding wheels 120 are circular in outline, as is clearly shown in FIGURE 3, and since the partially formed package including a carrier blank 20 and six bottles B are progressively moved between the folding wheels 120, the folding wheels 120 progressively engage lower portions of the carrier blank 20, as it appears in FIGURE 11, and initially force the same inwardly beneath the bottles B. This initial folding of the carrier blank 20 takes place along the fold lines 24 and 48 on one hand and the fold lines 27 and 49 on the other hand. Due to the fact that the carrier blank must be folded down around the peripheral surfaces of the folding wheels 120, because of the existence of the guides 123 and these guides engaging the bottom forming panels 28 and 30, it will be seen that the portions of the carrier blank 20 engaged by the folding wheels 120 tightly grip the peripheral surfaces of the folding wheels 120 and in addition to the desired folding of the carrier blank 20, the carrier blank 20 is drawn tight together beneath the bottles B and the desired interlocks between the bottles B and the side wall panels 25 and 26 of the resultant carrier, is accomplished, as is clearly shown in FIGURE 14. Due to the fact that the bottles B are disposed on opposite sides of the guide 56, there can be no transverse shifting of the bottles B beyond the positions shown in FIGURES 12 and 14.

Figure 12:
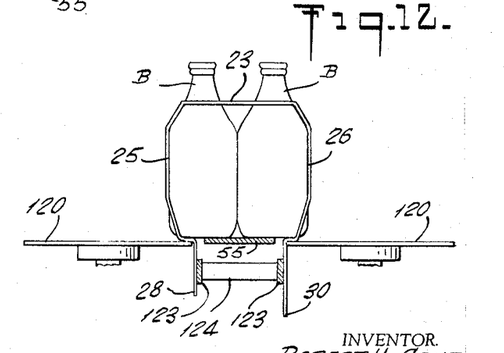
FIGURE 12 is a fragmentary transverse vertical sectional view taken along the section line 12—12 appearing in FIGURES 1 and 3 and shows the manner in which the carrier is folded beneath the containers and tightly joined against the lower portions of the containers to form interlocks therewith.

After the carrier blank 20 has been wrapped around the bottles B to the extent shown in FIGURE 12, the center guide 56 is discontinued and the partially completed package is moved onto a bottom folding and locking mechanism 125 of a conventional type and which in itself is not part of this invention. The folding mechanism has accordingly been illustrated in block form in FIGURE 1.

Figure 18:
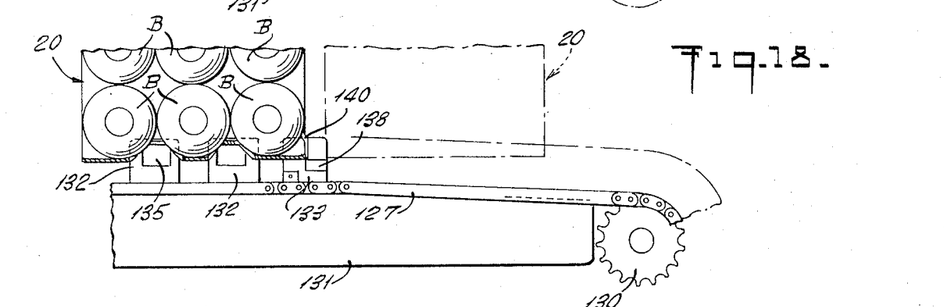
Figure 19:
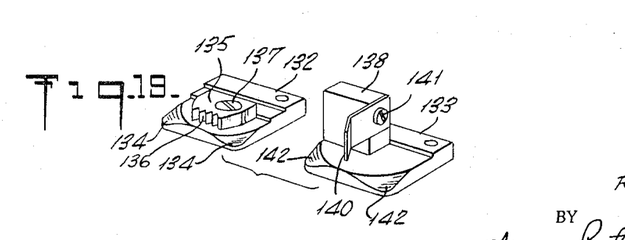
FIGURE 19 is a perspective view of two of the container-engaging blocks for feeding the assembled containers and carriers and urging together lower portions of the carriers, the connecting chain being omitted for purposes of clarity.

The partially completed packages are moved over the folding mechanism 125 by means of a pair of endless conveyors generally referred to by the numeral 126 and disposed symmetrically on opposite sides of the center line of the machine 50. Each endless conveyor 126 includes a conveyor chain 127 which passes around a drive sprocket 128 and a pair of idler sprockets 129 and 130. The opposed runs of the conveyor belt 126 pass over suitable guides 131 which are disposed intermediate the sprockets 129 and 130. Each conveyor chain 127 is provided with continuous sets of lugs and with each set of lugs including two lugs 132 and a lug 133. As is clearly illustrated in FIGURE 19, a typical lug 132 is provided with a projecting surface wherein the corners thereof have been rounded to define seats 134 for bottom portions of bottles. In addition, each lug 132 is provided with a carrier gripper 135 having a toothed carrier engaging face 136. The carrier gripper 135 is secured to its respective lug 132 by means of a fastener 137. The movements of the lugs 132 are timed so that the gripper plates 135 will engage the side wall panels 25 and 26 of the carrier blank intermediate two bottles, as is clearly shown in FIGURE 18 to assure a tight holding together of the interlocked carrier blank and bottles during the folding of the bottom forming panels 28 and 30 beneath the bottom of the bottles and the interlocking thereof to assure a tight package.

The lug 133 of each set of lugs is provided with an upstanding block 138 to which there is secured a pusher finger 140 by means of a fastener 141. Each lug 133 is adapted to pass beneath a pair of bottles and as a result has rounded corners defining seats 142 on which bottom portions of bottles may seat. The pusher fingers 140 of the lugs 133 engage behind the rearmost bottles of each package so as to push the package defined by the bottles and a carrier through the machine.

*Drive train*

The entire machine 50 is driven from a single power unit in the form of an electric motor 143 which is suitably mounted in the lower portion of the frame of the machine 50. The electric motor 143 carries a drive pulley 144 which is aligned with a driven pulley 145. The driven pulley 145 is mounted on an end of a transverse shaft 146 which is suitably journalled in bearings 147 carried by the frame of the machine 50. The pulley 145 is driven from the pulley 144 by means of a drive belt 148.

As is best shown in FIGURES 1 and 2, the machine 50 includes a pair of gear boxes or miter boxes 149 disposed adjacent the side plates 51 and 52 and in overlying relation to the shaft 146. Each gear box 149 includes a horizontal shaft 150, an upstanding vertical shaft 151 and a depending vertical shaft 152. A sprocket 139 is mounted on each horizontal shaft 150 in alignment with a similar sprocket 159 carried by the shaft 146. A drive chain 153 is entrained over the sprockets 139 and 159 to drive each of the gear boxes 149 from the shaft 146.

At this time, it is pointed out that the sprockets 60 of the conveyors 57 are mounted on the upwardly directed shafts 151 and the conveyors 57 are driven in this manner.

Referring to FIGURE 1 in particular, it will be seen that the shaft 146 is provided with a sprocket 154 on the outer end thereof which is aligned with the sprocket 75 of the shaft 72. A drive chain 55 is entrained over the sprockets 75 and 174 to drive the shaft 72 from the shaft 146 in timed relation thereto.

At each side of the center line of the machine 50 there is an upstanding shaft 156 which is suitably journalled in a bearing 157 carried by the horizontal plate 122. The lower end of the shaft 156 is disposed below the plate 122 and carries a sprocket 158 which is aligned with a sprocket 160 disposed on the associated downwardly directed shaft 152. A drive chain 161 connects each sprocket 160 to its associated sprocket 158.

As is best shown in FIGURE 2, a shaft 162 extends upwardly from the plate 122 of the frame of the machine to the left of the shafts 156 and 121. The shafts 121, 156 and 162 are disposed in generally triangular relation. At the upper end of the shaft 156 there is a sprocket 163. A sprocket 164 is carried by the shaft 121 and is secured to the folding wheel 120 for rotation therewith. It is to be noted that each folding wheel 120 and its associated sprocket 164 are mounted on a common hub 165. The shaft 162 also carries a sprocket 166 which lies in the same plane as the sprockets 163 and 164. An endless chain 167 is entrained over the sprockets 163, 164 and 166 to drive the same. The conveyor chain 167 also engages an idler sprocket 168 to change the direction of the conveyor run between the sprockets 163 and 166. It will be readily apparent that by driving the sprockets 164, the folding wheels 120 are similarly driven.

At this time it is pointed out that the conveyor chains 167 also serve to drive the conveyors 126. The sprocket 128 of each conveyor 126 is carried by the shaft 162 and is mounted on a common hub 169 with the sprocket 166. At this time it is also pointed out that the sprockets 129 and 130 of the conveyors 126 are also carried by suitable shafts including the shaft 170 for the sprocket 129 shown in FIGURE 2.

It will be readily apparent that since all of the operating mechanism of the machine 50 is driven from a single motor, all of the mechanism operates in timed sequence. Thus, once the sequence of operation of the machine 50 has been properly set, it remains constant throughout the use of the machine.

Figures 20, 21:
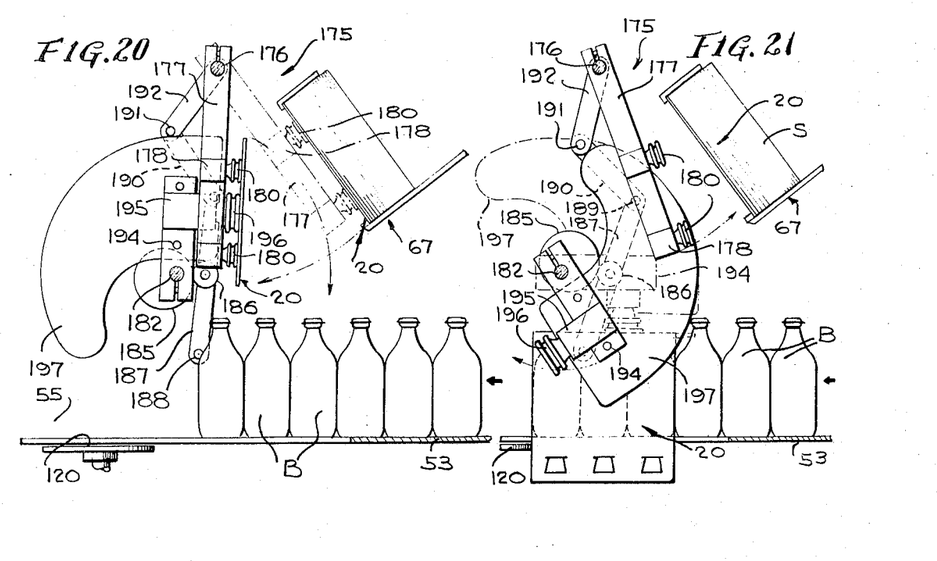
FIGURE 20 is a schematic longitudinal sectional view through the machine showing a modified form of second blank carrier in position for receiving a carrier blank from the first blank carrier.
FIGURE 21 is a fragmentary longitudinal schematic sectional view similar to FIGURE 20 and shows the second blank carrier of FIGURE 20 in position applying the blank carried thereby to a plurality of containers.
Figure 22:
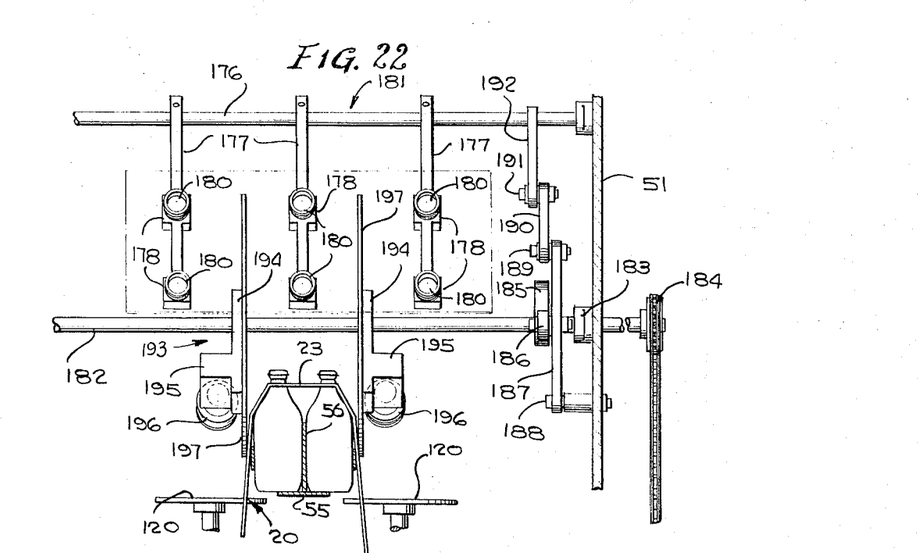
FIGURE 22 is a fragmentary transverse vertical sectional view similar to FIGURE 8 and shows specifically the details of the modified form of second blank carrier and the operation of the folding blades associated therewith for the purpose of initially folding the carrier blank around the containers.

Reference is now made to FIGURES 20, 21 and 22 wherein a modified form of blank transfer mechanisms is shown. The blank transfer mechanism 175 includes a rocker shaft 176 which extends transversely of the path of containers through the machine 50 and is suitably journalled in the frame. The shaft 176 corresponds in purpose and position to the shaft 78. The shaft 176 is provided with three arms 177 which are spaced along the left of the shaft, as is best shown in FIGURE 22. Each of the arms 177 is provided with a pair of blocks 178 which carries suction cups 180. The suction cups 180 are adapted to engage the lowermost carrier blank 20 in the hopper 67 and remove the same therefrom in the same manner described above with respect to the first blank carrier 80. At this time, it is pointed out that the shaft 176, the arms 177 and the suction cups 180 form portions of a first blank carrier generally referred to by the numeral 181.

The mechanism 175 also includes a transverse shaft 182 which is suitably journalled in the frame of the machine 50. The shaft 182 corresponds generally to the shaft 72. However, the shaft 182 is moved more closely to the position of the shaft 176 in a direction longitudinally of the machine. It is also to be noted that the shaft 182 occupies a position lower than the shaft 72. As is best shown in FIGURE 21, the shaft 182 is rotatably journalled in bearings 183 carried by the side plates 51 and 52 of the frame of the machine 50.

The shaft 182 is provided on one end thereof with a sprocket 184 which corresponds to the sprocket 75 and is driven in the same manner as is the shaft 72. It is to be understood that the shaft 182 will make one revolution in the time it takes one complete set of bottles B to pass a predetermined point beneath the shaft 182.

The shaft 182 is provided at the right side thereof as viewed in FIGURE 22, adjacent the bearing 183 with a cam 185. The cam 185 is engaged by the cam follower 186 on a lever 187 which is pivotally mounted on a lower pivot pin 188 carried by the side plate 51. The upper end of the lever 187 is connected by means of a pin 189 to the lower end of a link 190 which has the upper end thereof connected by means of a pin 191 to a crank arm 192 secured to the rocker shaft 176. Thus, as the shaft 182 rotates, the cam 185 is effective through the lever 187, the link 190 and the crank arm 192 to rock the rocker shaft 176 to produce the necessary swinging movement of the arms 177 and the suction cups 180 carried thereby to move the suction cups 180 from the carrier blank removing position shown in dotted lines in FIGURE 20 to the solid line position thereof.

Although the shaft 182 serves to drive the first blank carrier 181, it also serves to support and operate a second blank carrier, generally referred to by the numeal 193. The second blank carrier 193 includes a pair of arms 194 which are rigidly secured to the shaft 182 for rotation therewith. The arms 194 are disposed on opposite sides of the central arm 177 intermediate the outer arms 177 of the blank carrier 181 and are disposed outwardly of the path of the bottles B through the machine 50. Each of the arms 194 carries a block 195 on which there is mounted a suction cup 196.

It is also to be noted that the arms 194 carry folding blades 197. The suction cups 196 are disposed outwardly of the arms 194 whereas the folding blades 197 are disposed inwardly of the arms 194. It is to be noted that the folding blades 197 are positioned just outside of the path of the bottles B through the machine to effectively fold the carrier blank down alongside of the bottles.

Operation of modified form of blank transfer mechanism

In the operation of the blank transfer mechanism 175, as the shaft 182 rotates, the suction cups 180 will be brought into contact with the lowermost carrier blank 20 of the hopper 67. Further rotation of the shaft 182 results in the swinging of the suction cups 180 and the carrier blank 20 attached thereto in a clockwise direction, as is generally indicated in FIGURE 20. When the suction cups 180 reach the lower end of their travel, the suction cups 196, which are rotating in a clockwise direction, come into alignment with the suction cups 180 and engage the carrier blank supported by the suction cups 180. The carrier blank is then transferred from the suction cups 180 to the suction cups 196 and is moved downwardly in a clockwise direction towards the line of bottles B passing therebeneath.

As the shaft 182 continues to rotate, the carrier blank 20 will be moved downwardly in timed relation to the movement of the set of bottles therebeneath so that when the carrier blank 20 reaches a substantially horizontal position, it lies in the planes of the extreme tops of the bottles B. Further rotation of the shaft 182 results in further downward and forward movement of the carrier blank 20 with the result that the carrier blank 20 is forced down over the necks of the bottles B with the necks of the bottles passing through the openings 34 in the carrier blank. Further downward movement of the carrier blank 20 due to the rotation of the shaft 182 results in the firm engagement of the top wall panel 23 of the carrier blank with the upper portion of the bottles B.

As the shaft 182 continues to rotate, the folding blades 197 come into engagement with the carrier blank 20 intermediate the suction cups 196 and serve to fold the carrier blank 20 down around the set of bottles in the manner best shown in FIGURE 22. As the folding blades 197 fold the carrier blank around the bottles, the carrier blank is moved out of engagement with the suction cups 196 and released therefrom. The application of the carrier to the set of bottles continues from the step shown in FIGURE 22 in the manner previously described with the other form of blank transfer mechanism.

At this time, it is pointed out that no emphasis has been placed upon the construction of the various suction cups disclosed herein. However, in the preferred embodiments of the machine, the suction cups will be connected to a suitable vacuum source in a known manner and conventional valving will be provided for automatically energizing and deenergizing the suction cups in timed relation to the desired operation thereof. However, the invention is not to be limited to suction cups which are connected to a vacuum source in that it is feasible for the suction cups to be of the self-energizing type. It will be readily apparent that due to the fact that at the time of transfer of the carrier blank from the first blank carrier to the second blank carrier, the two blank carriers move in opposite directions, and the folding blades will serve to move the carrier blanks from the second blank carrier, the use of self-energizing suction cups is feasible.

It will be readily apparent that by utilizing two separate blank carriers as part of the blank transfer mechanism, the transfer of blanks from the hopper and the application thereof to containers will be expedited. The transfer of blanks from a hopper to the containers being the crucial step time-wise, it will be readily apparent that the use of a double mechanism of the type set forth herein will greatly reduce the time required to transfer a blank from the hopper to containers.

Although only preferred embodiments of the invention have been illustrated and described herein, it is to be understood that minor modifications may be made in the machine within the spirit and scope of the invention, as defined in the appended claims.

What is claimed is:

1. In a machine for wrapping carrier blanks around sets of containers, means for moving containers along a predetermined path, a blank hopper disposed above the plane of said path, first blank moving means for removing carrier blanks from said hopper, and second blank moving means for receiving carrier blanks from said first blank moving means and positioning the carrier blanks into overlying relation to containers, said first and second blank moving means having blank retaining members facing in the same direction at the time of blank transfer therebetween.

2. In a machine for wrapping carrier blanks around sets of containers, means for moving containers along a predetermined path, a blank hopper disposed above the plane of said path, pivotally mounted first blank moving means for removing carrier blanks from said hopper, pivotally mounted second blank moving means for receiving carrier blanks from said first blank moving means and positioning the carrier blanks into overlying relation to containers, and means for moving said first and second blank moving means in unison in like directions longitudinally of the path.

3. In a machine for wrapping carrier blanks around sets of containers, means for moving containers along a predetermined path, a blank hopper disposed above the plane of said path, first blank moving means for removing carrier blanks from said hopper, second blank moving means for receiving carrier blanks from said first blank moving means and positioning the carrier blanks into overlying relation to containers, and means for moving said first and second blank moving means in unison in like directions longitudinally of the path and in opposite vertical directions.

4. In a machine for wrapping carrier blanks around sets of containers, means for moving containers along a predetermined path, a blank hopper disposed above the plane of said path, first blank moving means for removing carrier blanks from said hopper, second blank moving means for receiving carrier blanks from said first blank moving means and positioning the carrier blanks into overlying relation to containers, and means mounted for movement with said second blank moving means to simultaneously fold blanks around containers and strip the same blanks from said second blank moving means.

5. In a machine for wrapping carrier blanks around sets of containers, means for moving containers along a predetermined path, a blank hopper disposed above the plane of said path, first blank moving means for removing carrier blanks from said hopper, and second blank moving means for receiving carrier blanks from said first blank moving means and positioning the carrier blanks into overlying relation to containers, said second blank moving means including carrier blank grippers spaced apart transversely of the container path, and means mounted intermediate said blank grippers for engaging and folding blanks around containers while simultaneously stripping the blanks from said blank grippers in response to downward movement of said blank grippers beyond a container engaging position of an associated carrier blank.

6. In a machine for wrapping carrier blanks around sets of containers, means for moving containers along a predetermined path, a blank hopper disposed above the plane of said path, a first carrier blank gripper mounted for swinging movement about an axis transverse to the container path downwardly away from said hopper and return, a second blank gripper mounted for swinging movement about a second axis transverse to the container path downwardly from a position aligned with said first blank gripper remote from said hopper to a position directly overlying the container path and return, said second blank gripper being pivotally carried by an arm, and guide means for controlling the pivoting of said second blank gripper during the swinging thereof.

7. In a machine for wrapping a carrier blank around a plurality of containers to form a package, a blank carrier for positioning a central portion of a carrier blank into overlying relation to a set of containers, said blank carrier including widely spaced blank grippers engageable with portions of a carrier blank adapted to be folded around containers, and blank folding means carried by said blank carrier between said blank grippers to fold portions of a blank around containers immediately after the blank is positioned on a set of containers in response to further movement of said blank carriers towards the containers.

8. The machine of claim 7 wherein said blank grippers are suction cups whereby the folding action of said blank folding means results in the simultaneous stripping of the blank from said blank grippers.

9. The machine of claim 7 wherein said blank carrier is pivotally mounted on a swinging arm, and guide means cooperate with said blank carrier to position the same.

10. In a machine for wrapping carrier blanks around sets of containers, means for moving containers along a predetermined path, a blank hopper disposed above the plane of said path, first blank moving means for removing carrier blanks from said hopper, second blank moving means for receiving carrier blanks from said first blank moving means and positioning the carrier blanks into overlying relation to containers, means mounted for movement with said second blank moving means to simultaneously fold blanks around containers and strip the same blanks from said second blank moving means, and cooperating blank folding means for simultaneously folding portions of a blank beneath a set of containers and drawing lower side wall portions of the blank tight around the containers to form interlocks therewith.

11. The machine of claim 10 wherein said cooperating blank folding means include opposed rotating wheels disposed on opposite sides of the container path and having upper surfaces lying in a plane disposed immediately below the container path, and blank guide means disposed below the container path for holding portions of the blank in engagement with peripheral surfaces of said wheels.

12. The machine of claim 11 wherein the container path is defined by a lower support and an upstanding central guide, the central guide serving to maintain a centered position of containers between said wheels.

13. In a machine for wrapping a carrier blank around a set of containers, means for moving the set of containers along a predetermined path, means for applying a blank over and down alongside a set of containers, and cooperating blank folding means for simultaneously folding portions of a blank beneath a set of containers and drawing lower sidewall portions of the blank tight around the containers to form interlocks therewith, wherein said cooperating blank folding means include opposed rotating wheels disposed on opposite sides of the container path and having upper surfaces lying in a plane disposed immediately below the container path, and blank guide means disposed below the container path for holding portions of the blank in engagement with peripheral surfaces of said wheels.

14. The machine of claim 13 wherein the container path is defined by a lower support and an upstanding central guide, the central guide serving to maintain a centered position of containers between said wheels.

15. In a machine for wrapping carrier blanks around sets of containers, means for moving containers along a predetermined path, a blank hopper disposed above the plane of said path, a first carrier blank gripper mounted for swinging movement about an axis transverse to the container path downwardly away from said hopper and return, a second blank gripper mounted for swinging movement about a second axis transverse to the container path downwardly from a position aligned with said first blank gripper remote from said hopper to a position directly overlying the container path and return, said second blank gripper being mounted on a continuously rotating shaft.

16. In a machine for wrapping carrier blanks around sets of containers, means for moving containers along a predetermined path, a blank hopper disposed above the plane of said path, a first carrier blank gripper mounted for swinging movement about an axis transverse to the container path downwardly away from said hopper and return, a second blank gripper mounted for swinging movement about a second axis transverse to the container path downwardly from a position aligned with said first blank gripper remote from said hopper to a position directly overlying the container path and return, said second blank gripper being mounted on a continuously rotating shaft, and means on said rotating shaft for swinging said first blank gripper in timed relation to the rotation of said second blank gripper.

17. In a machine for wrapping carrier blanks around sets of containers, means for moving containers along a predetermined path, a blank hopper disposed above the plane of said path, a first carrier blank gripper mounted for swinging movement about an axis transverse to the container path downwardly away from said hopper and return, a second blank gripper mounted for swinging movement about a second axis transverse to the container path downwardly from a position aligned with said first blank gripper remote from said hopper to a position directly overlying the container path and return, said second blank gripper being mounted on a continuously rotating shaft, and folding blades carried by said rotating shaft adjacent said second blank gripper for folding a carrier blank down alongside a plurality of containers.

18. In a machine for wrapping carrier blanks around sets of containers, means for moving containers along a predetermined path, a blank hopper disposed above the plane of said path, a first carrier blank gripper mounted for swinging movement about an axis transverse to the container path downwardly away from said hopper and return, a second blank gripper mounted for swinging movement about a second axis transverse to the container path downwardly from a position aligned with said first blank gripper remote from said hopper to a position directly overlying the container path and return, said second blank gripper being mounted on a continuously rotating shaft, means on said rotating shaft for swinging said first blank gripper in timed relation to the rotation of said second blank gripper, and folding blades carried by said rotating shaft adjacent said second blank gripper for folding a carrier blank down alongside a plurality of containers.

19. A blank transfer assembly comprising means defining a path of movement of articles, a blank hopper positioned above said path, a first swinging member having an upper pivot and being movable from a blank receiving position beneath said hopper to a generally vertical position, a second swinging member having a lower pivot and being movable from a generally vertical position generally in alignment with said first swinging member to a discharge position overlying said path, and blank holding means carried by each of said swinging members facing in the same direction when said swinging members are aligned.

20. A blank transfer assembly comprising means defining a path of movement of articles, a blank hopper positioned above said path, a first swinging member having an upper pivot and being movable from a blank receiving position beneath said hopper to a generally vertical position, a second swinging member having a lower pivot and being movable from a generally vertical position generally in alignment with said first swinging member to a discharge position overlying said path, and blank holding means carried by each of said swinging members facing in the same direction when said swinging members are aligned, and means coupled to said swinging members for oscillating said swinging members in unison but in different clockwise directions.

References Cited by the Examiner
UNITED STATES PATENTS

| | | | |
|---|---|---|---|
| 2,737,001 | 3/1956 | Bucha | 53—386 X |
| 2,974,454 | 3/1961 | Andre et al. | 53—48 X |
| 2,998,685 | 9/1961 | Ganz | 53—48 X |
| 3,061,985 | 11/1962 | Ganz | 53—48 |
| 3,064,404 | 11/1962 | Chidsey et al. | 53—48 |

FRANK E. BAILEY, *Primary Examiner.*

TRAVIS S. McGEHEE, GRANVILLE Y. CUSTER, JR.,
*Examiners.*

A. E. FOURNIER, P. H. POHL, R. J. ALVEY,
*Assistant Examiners.*